Jan. 4, 1966 W. C. WOOD 3,226,846
MEDICAL TEACHING AID
Original Filed Aug. 3, 1964
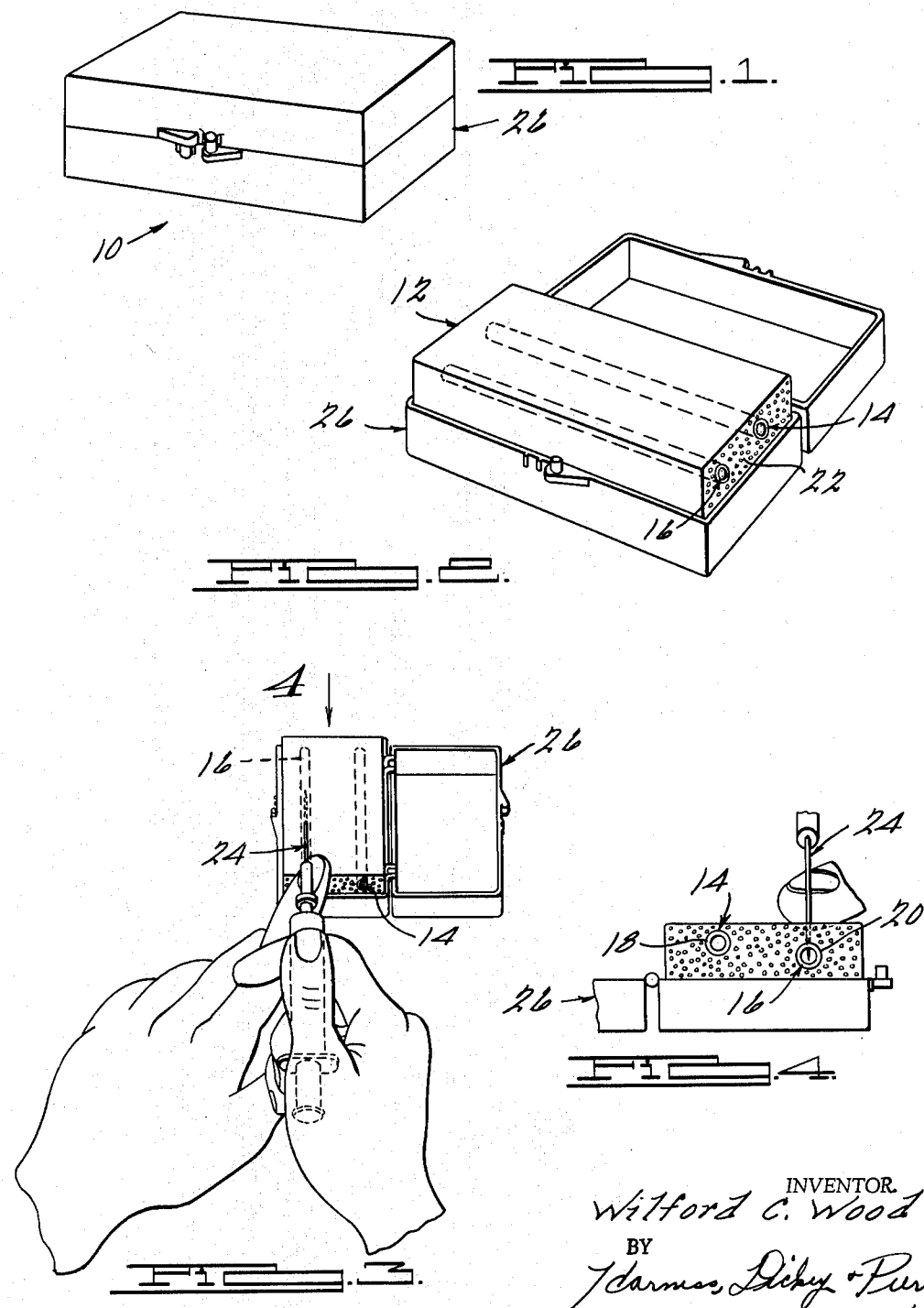
INVENTOR.
Wilford C. Wood
BY
Carmen, Dickey + Pierce
ATTORNEYS.

United States Patent Office 3,226,846
Patented Jan. 4, 1966

3,226,846
MEDICAL TEACHING AID
Wilford C. Wood, 463 Fisher Bldg., Detroit, Mich.
Continuation of application Ser. No. 388,032, Aug. 3, 1964. This application Dec. 17, 1964, Ser. No. 419,125
1 Claim. (Cl. 35—17)

This invention relates generally to an improved medical teaching aid and more particularly to a teaching aid for use by medical students, nurses, etc. in developing the sense of touch necessary for proper intravenous technique and in practicing such technique with a hypodermic needle. The present application is a continuation of my copending application Serial No. 388,032 filed August 3, 1964, now abandoned, for Medical Teaching Aid.

There has long been a need for a teaching aid that enables a student to fully develop the sense of touch and self confidence necessary for proper intravenous technique prior to performing such operations on live patients. Devices heretofore known and used for teaching purposes have not proved to be fully satisfactory since they do not properly develop a student's sense of touch much less build a student's confidence in his sense of touch. To be fully satisfactory, a teaching aid for intravenous technique should simulate the feel of skin, the consistency of flesh and a blood vessel, and thereafter permit the student to verify the accuracy and degree of penetration of the hypodermic needle. As a practical matter, a student must be reassured after each practice insertion that accurate and proper penetration is achieved in order to develop confidence in his sense of touch.

Proper intravenous technique first requires development of the sense of touch used to locate a blood vessel. Thereafter, a sense of touch must be developed so as to exert adequate pressure on the needle for penetration of skin, flesh, and one wall of the blood vessel, yet stop short of the opposite wall of the blood vessel. Prior art teaching aids are inadequate in developing the aforesaid touch senses since they generally have a tough outer skin and do not permit the student to visually determine the degree of penetration of the hypodermic needle after each practice insertion.

The medical teaching aid of the instant invention solves the problems associated with teaching aids heretofore known and used in that it enables a student to develop confidence in his sense of touch by practicing the aforesaid technique of locating the blood vessel by the sense of touch, inserting the hypodermic needle by the sense of touch, and thence to visually check the accuracy and degree of penetration of the needle.

Accordingly, the object of the present invention is an improved teaching aid by which a student can develop skill and confidence in his intravenous technique by locating a blood vessel by the sense of touch, piercing the tissue and one wall of the blood vessel by the sense of touch, and thereafter determining if penetration is proper by visual inspection.

Other objects and advantages of this invention will be apparent from the following description, claims and drawings wherein:

FIGURE 1 is a perspective view illustrating the teaching aid packaged in a case, FIG. 2 is a view similar to FIG. 1 but showing the case in the open condition and the teaching aid ready for use, FIG. 3 is a perspective view illustrating the use of the teaching aid, and FIG. 4 is a view taken in the direction of the arrow 4 of FIG. 3.

A medical teaching aid 10, in accordance with a constructed embodiment of the present invention, comprises a rectangular block of foam or sponge rubber 12 approximately one inch thick, two inches wide and three inches long. In accordance with one feature of the instant invention the foam block 12 is homogeneous and is of a consistency that simulates human flesh, the upper surface thereof being smooth and opaque and stretchable thereby to simulate human skin. It is important that the upper surface of the foam block 12 not be excessively tough or impenetrable.

Within the foam block 12 there are embedded one or more rubber tubes 14 and 16 which simulate blood vessels. The tubes 14 and 16 are preferably of gum rubber and have walls with an outside diameter from $\frac{1}{16}''$ to $\frac{1}{4}''$ and a wall thickness from $\frac{1}{64}''$ to $\frac{1}{16}''$. With such diameters and thicknesses, the tubes 14 and 16, when pressed upon from the upper surface of the foam block 12, offer to the sense of touch a resistance resembling that of a distended blood vessel. I prefer to embed such tubes at a depth from $\frac{1}{16}''$ to $\frac{1}{4}''$ from the upper surface of the foam rubber block to simulate the position of blood vessels at those locations of the human body where hypodermic injections are satisfactorily made. The tubes 14 and 16 may be embedded at an equal depth or at different depths.

In accordance with another feature of the present invention, the tubes 14 and 16 are relatively straight and the terminal ends 18 and 20 thereof, respectively, are visible. Further, it is important that the terminal ends 18 and 20 of the tubes 14 and 16, respectively, be supported by the foam block 12 or, in other words, the ends 18 and 20 of the tubes 14 and 16, respectively, should be substantially coterminous with a generally planer end face 22 of the foam block 12. Thus, flexure of the tubes 14 and 16 is minimized thereby rendering visual inspection of the position of a hypodermic needle 24 possible by sighting down the center of the tubes. My construction is to be distinguished from prior art constructions wherein the tubes extend beyond the foam support therefore rendering visual sighting through the tube difficult or impossible.

The foam block 12, with the tubes 14 and 16 embedded therein, is housed within a plastic case 26 of a suitable size so that the open ends 18 and 20 of the tubes 14 and 16, respectively, are visible. The size of the foam block 12 and of the case 26 are preferably such that the case 26 may be conveniently carried in a pocket.

It is to be understood that the improved medical teaching aid herein disclosed and described is presented for the purpose of explanation and illustration and is not intended to indicate limits of the invention, the scope of which is defined by the following claim.

What is claimed is:

An aid for teaching intravenous technique by developing manual sensitivity to the location of a blood vessel and to the accuracy and degree of penetration of a hypodermic needle comprising:

a relatively small block of substantially homogenous foam rubber, the cells at the top surface of said foam rubber block being flattened at the uppermost portion thereof so as to present a smooth opaque stretchable top surface simulating human skin, said foam rubber block having a pair of spaced generally planer end faces extending generally parallel to one another and generally normal to the top surface thereof, and a substantially straight hollow gum rubber tube embedded in said block at a predetermined depth below the top surface thereof and extending generally parallel thereto so as to be invisible upon visual inspection of the top surface of said foam block and so as to be maintained in the straight condition yet be detectable by the sense of touch, the opposite terminal end portions of said rubber tube being substantially coterminous with the end faces of said foam block, respectively, so that the entire length of the tube is positively supported, whereby the accuracy and degree of penetration of the hypodermic needle into said tube can be visually inspected by viewing the end of the hypodermic needle through the open tube.

References Cited by the Examiner

UNITED STATES PATENTS

| | | | |
|---|---|---|---|
| 2,689,415 | 9/1954 | Haver | 35—17 |
| 2,704,897 | 3/1955 | Lade | 35—17 |
| 2,871,579 | 2/1959 | Niiranen et al. | 35—17 |

EUGENE R. CAPOZIO, *Primary Examiner.*

LAWRENCE CHARLES, *Examiner.*

WILLIAM GRIEB, *Assistant Examiner.*